(12) United States Patent
Lee

(10) Patent No.: US 10,999,625 B2
(45) Date of Patent: May 4, 2021

(54) METHOD FOR REPORTING QOS/QOE IN MOBILE ENVIRONMENT AND DEVICE THEREFOR

(71) Applicant: SK TELECOM CO., LTD., Seoul (KR)

(72) Inventor: Jongmin Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 16/222,694

(22) Filed: Dec. 17, 2018

(65) Prior Publication Data

US 2019/0166398 A1    May 30, 2019

Related U.S. Application Data

(63) Continuation of application No. PCT/KR2017/005314, filed on May 23, 2017, which
(Continued)

(30) Foreign Application Priority Data

Jan. 10, 2017    (KR) .................. 10-2017-0003832

(51) Int. Cl.
*H04N 21/442*    (2011.01)
*H04W 28/02*    (2009.01)
(Continued)

(52) U.S. Cl.
CPC ...... *H04N 21/44209* (2013.01); *H04H 60/00* (2013.01); *H04L 47/2416* (2013.01);
(Continued)

(58) Field of Classification Search
CPC ....... H04N 21/44209; H04N 21/64738; H04N 21/6581; H04W 28/0236
(Continued)

(56) References Cited

U.S. PATENT DOCUMENTS 6,256,634 B1 *   7/2001   Moshaiov .......... G06F 16/2308
8,711,705 B1 *   4/2014   Johnson .............. H04L 41/5009
                                                                370/241
(Continued)

FOREIGN PATENT DOCUMENTS

KR    10-2011-0071411 A    6/2011
KR    10-2014-0116440 A    10/2014
(Continued)

OTHER PUBLICATIONS

International Search Report for PCT/KR2017/005314 dated Aug. 14, 2017.

*Primary Examiner* — Joseph L Greene
(74) *Attorney, Agent, or Firm* — Hauptman Ham, LLP

(57) ABSTRACT

The present disclosure relates to a method and device for reporting the quality of a mobile streaming service. A terminal device receiving a mobile streaming service through at least one communication network measures the quality of the streaming service, generates, on the basis of the measurement result, a mobile service quality indicator for monitoring QoS or QoE, and reports the generated mobile service quality indicator in real time through an MQI message, an NAM feedback message, or the like, thereby enabling network conditions to be effectively monitored even in a mobile streaming environment.

4 Claims, 6 Drawing Sheets

Related U.S. Application Data is a continuation-in-part of application No. 15/183,242, filed on Jun. 15, 2016.

(60) Provisional application No. 62/184,979, filed on Jun. 26, 2015, provisional application No. 62/180,295, filed on Jun. 16, 2015.

(51) Int. Cl.

| | |
|---|---|
| *H04L 12/853* | (2013.01) |
| *H04L 12/825* | (2013.01) |
| *H04H 60/00* | (2009.01) |
| *H04L 29/06* | (2006.01) |
| *H04L 12/859* | (2013.01) |
| *H04N 21/658* | (2011.01) |
| *H04N 21/647* | (2011.01) |
| *H04L 29/08* | (2006.01) |

(52) U.S. Cl.
CPC .......... *H04L 47/2475* (2013.01); *H04L 47/26* (2013.01); *H04L 65/80* (2013.01); *H04W 28/0236* (2013.01); *H04L 67/02* (2013.01); *H04N 21/64738* (2013.01); *H04N 21/6581* (2013.01)

(58) Field of Classification Search
USPC .......................................................... 725/62
See application file for complete search history.

(56) References Cited

U.S. PATENT DOCUMENTS

| | | | | |
|---|---|---|---|---|
| 2013/0115970 | A1* | 5/2013 | Hapsari | H04W 24/10 |
| | | | | 455/456.1 |
| 2014/0244849 | A1* | 8/2014 | Rizzo | H04L 47/2416 |
| | | | | 709/226 |
| 2014/0314080 | A1* | 10/2014 | Park | H04L 47/23 |
| | | | | 370/391 |
| 2015/0181549 | A1* | 6/2015 | Batada | G01S 5/14 |
| | | | | 455/456.1 |
| 2017/0116055 | A1* | 4/2017 | Harran | G06F 9/546 |
| 2018/0132061 | A1* | 5/2018 | Bitra | H04L 5/0048 |

FOREIGN PATENT DOCUMENTS

| | | |
|---|---|---|
| KR | 10-2015-0028588 A | 3/2015 |
| KR | 10-2015-0084325 A | 7/2015 |
| KR | 10-2016-0030308 A | 3/2016 |

* cited by examiner

FIG. 3

| Syntax | Values | No. of bits | Mnemonic |
|---|---|---|---|
| MQI_message () { | | | |
|     device_id | | 64 | unsigned integer |
|     device_capability | | 32 | unsigned integer |
|     C_id | | 32 | unsigned integer |
|     buffer_underrun | | 8 | unsigned integer |
|     Interface_type | | 8 | unsigned integer |
|     Video_quality | | 32 | unsigned integer |
|     packet_loss | | 8 | unsigned integer |
|     SRR | | 32 | float |
|     moving_speed | | 8 | float |
|     generation_time | | 32 | float |
| } | | | |

FIG. 4

| Syntax | Values | No. of bits | Mnemonic |
|---|---|---|---|
| MQI_message () { | | | |
|     message_id | | 16 | unsigned short |
|     version | | 8 | unsigned char |
|     length | | 16 | unsigned short |
|     message_payload{ | | | |
|         generation_time | | 32 | unsigned integer |
|         client_id | | 32 | unsigned integer |
|         Time_C_id | | 32 | unsigned integer |
|         Rebuffering_duration | | 8 | unsigned char |
|         Jitter_duration | | 8 | unsigned char |
|         Packet_loss_count | | 8 | unsigned char |
|         interface_type | | 16 | unsigned short |
|             video_quality(){ | | | |
|                 freeze | | 8 | unsigned char |
|                 black | | 8 | unsigned char |
|                 mb | | 8 | unsigned char |
|             } | | | |
|         } | | | |
| } | | | |

FIG. 5

| Syntax | Values | No. of bits | Mnemonic |
|---|---|---|---|
| NAMF_message ( ) { | | | |
|     message_id | | 16 | unsigned short |
| version | | 8 | unsigned char |
| length | | 16 | unsigned short |
| NAM_flag | | 1 | unsigned integer |
| reserved | | 7 | unsigned integer |
| if(NAM_flag == 0) | | | |
| { | | 8 | unsigned integer |
| message_payload{ | | 8 | float |
|         CLI_id | | 8 | float |
| | | 8 | float |
| relative_available_bitrate | | 16 | unsigned integer |
| | | 32 | float |
| relative_buffer_fullness | | 32 | float |
| | | 32 | float |
| relative_peak_bitrate | | | |
| | | | |
| average_bitrate_period | | 32 | unsigned integer |
|     current_delay | | 8 | unsigned integer |
|     generation_time | | 8 | unsigned integer |
|     BER | | 32 | unsigned integer |
|   C_id | | | |
|   buffer_underrun | | | |
|   Interface_type | | | |
|   Video_quality | | | |
|     } | | | |
| } | | | |
| else if(NAM_flag == 1) | | | |
| { | | | |
| message_payload{ | | | |
|     CLI_id | | 8 | unsigned integer |
|     available_bitrate | | 32 | float |
|     buffer_fullness | | 32 | float |
|     peak_bitrate | | 32 | float |
|     current_delay | | 32 | float |
|     average_bitrate_period | | 16 | unsigned interger |
|     SDU_size | | 32 | unsigned integer |
|     SDU_loss_ratio | | 8 | unsigned integer |
|     generation_time | | 32 | float |
|     BER | | 32 | float |
|     C_id | | 32 | unsigned integer |
|     buffer_underrun | | 8 | unsigned integer |
|     Interface_type | | 8 | unsigned integer |
|     Video_quality | | 32 | unsigned integer |
| | | | |
|   } | | | |
| }   } | | | |
| } } | | | |

FIG. 6

| Syntax | Values | No. of bits | Mnemonic |
|---|---|---|---|
| NAMF_message () { | | | |
|    message_id | | 16 | unsigned short |
| version | | 8 | unsigned char |
| length | | 16 | unsigned short |
| NAM_flag | | 1 | unsigned integer |
| reserved | | 7 | unsigned integer |
| if(NAM_flag == 0) | | | |
| { | | | |
| message_payload{ | | 8 | unsigned integer |
|    CLI_id | | 8 | float |
| | | 8 | float |
| | | 8 | float |
| relative_available_bitrate | | 16 | unsigned integer |
| | | 32 | float |
| relative_buffer_fullness | | 32 | float |
| | | 32 | float |
| relative_peak_bitrate | | | |
| average_bitrate_period | | 32 | unsigned integer |
|    current_delay | | 32 | unsigned integer |
|      generation_time | | 8 | unsigned char |
|      BER | | 8 | unsigned char |
|    client_id | | 8 | unsigned char |
|    Time_C_id | | 16 | unsigned short |
|    Rebuffering_duration | | | |
|    Jitter_duration | | 8 | unsigned char |
|    Packet_loss_count | | 8 | unsigned char |
|    interface_type | | 8 | unsigned char |
|      video_quality(){ | | | |
|        freeze | | | |
|        black | | | |
|        mb } | | | |
| } | | | |
| } | | | |
| else if(NAM_flag == 1) | | | |
| { | | | |
| message_payload{ | | | |
|    CLI_id | | 8 | unsigned integer |
|    available_bitrate | | 32 | float |
|    buffer_fullness | | 32 | float |
|    peak_bitrate | | 32 | float |
|    current_delay | | 32 | float |
|    average_bitrate_period | | 16 | unsigned interger |
|    SDU_size | | 32 | unsigned integer |
|    SDU_loss_ratio | | 8 | unsigned integer |
|    generation_time | | 32 | float |
|    BER | | 32 | Float |
|    client_id | | 32 | unsigned integer |
|    Time_C_id | | 32 | unsigned integer |
|    Rebuffering_duration | | 8 | unsigned char |
|    Jitter_duration | | 8 | unsigned char |
|    Packet_loss_count | | 8 | unsigned char |
|    interface_type | | 16 | unsigned short |
|    video_quality(){ | | | |
|      freeze | | 8 | unsigned char |
|      black | | 8 | unsigned char |
|      mb } | | 8 | unsigned char |
| } | | | |

FIG. 7

| Syntax | Value | No. of bits | Mnemonic |
|---|---|---|---|
| NAMF_message ( ) { | | | |
|     message_id | | 16 | uimsbf |
|     version | | 8 | uimsbf |
|     length | | 16 | uimsbf |
|     message_payload{ | | | |
|         CLI_id | | 8 | uimsbf |
|         NAM_flag | | 1 | boolean |
|         mobile_info_descriptor_flag | | 1 | boolean |
|         media_quality descriptor_flag | | 1 | boolean |
|         reserved | '11111' | 5 | uimsbf |
|         if(NAM_flag == 0){ | | | |
|             relative_available_bitrate | | 8 | uimsbf |
|             relative_buffer_fullness | | 8 | uimsbf |
|             relative_peak_bitrate | | 8 | uimsbf |
|             average_bitrate_period | | 16 | uimsbf |
|             current_delay | | 32 | uimsbf |
|             generation_time | | 32 | uimsbf |
|             BER | | 32 | uimsbf |
|             packet_loss_ratio | | 8 | uimsbf |
|             Jitter_duration | | 32 | uimsbf |
|         } | | | |
|         else if(NAM_flag == 1){ | | | |
|             available_bitrate | | 32 | uimsbf |
|             buffer_fullness | | 32 | uimsbf |
|             peak_bitrate | | 32 | uimsbf |
|             average_bitrate_period | | 16 | uimsbf |
|             current_delay | | 32 | uimsbf |
|             generation_time | | 32 | uimsbf |
|             BER | | 32 | uimsbf |
|             packet_loss_ratio | | 8 | uimsbf |
|             Jitter_duration | | 32 | uimsbf |
|             SDU_size | | 32 | uimsbf |
|             SDU_loss_ratio | | 8 | uimsbf |
|         } | | | |
|         if(mobile_info_descriptor_flag == 1){ | | | |
|             mobile_info_descriptor() | | | |
|         } | | | |
|         if(media_quality descriptor_flag == 1){ | | | |
|             media_quality_measurement() | | | |
|         } | | | |
|     } | | | |
| } | | | |

FIG. 8

| Syntax | Value | No. of bits | Mnemonic |
|---|---|---|---|
| mobile_info_descriptor() { | | | |
|     descriptor_tag | '0x0004' | 16 | uimsbf |
|     descriptor_length | | 16 | uimsbf |
|     MSISDN_flag | | 1 | boolean |
|     IMSI_flag | | 1 | boolean |
|     current_cell_id_flag | | 1 | boolean |
|     reserved | '1 1111' | 5 | uimsbf |
|     if(MSISDN_flag == 1){ | | | |
|         MSISDN | | 60 | uimsbf |
|         reserved | '1111' | 4 | uimsbf |
|     } | | | |
|     if(IMSI_flag == 1){ | | | |
|         IMSI | | 60 | uimsbf |
|         reserved | '1111' | 4 | uimsbf |
|     } | | | |
|     if(current_cell_id_flag == 1){ | | | |
|         current_cell_id | | 60 | uimsbf |
|         reserved | '1111' | 4 | uimsbf |
|     } | | | |
| } | | | |

FIG. 9

| Syntax | Value | No. of bits | Mnemonic |
|---|---|---|---|
| media_quality_descriptor() { | | | |
|     descriptor_tag | '0x0005' | 16 | uimsbf |
|     descriptor_length | | 16 | uimsbf |
|     num_time_sample | N1 | | |
|     for (i=0;i<N1;i++){ | | | |
|         timestamp | | 32 | uimsbf |
|         video_quality{ | | | |
|             freeze | | 8 | uimsbf |
|             black | | 8 | uimsbf |
|             mb_error | | 8 | uimsbf |
|         } | | | |
|         audio_quality{ | | | |
|             decoding_error | | 8 | uimsbf |
|         } | | | |
|     } | | | |
|     rebuffering_duration | | 32 | uimsbf |
| } | | | |

METHOD FOR REPORTING QOS/QOE IN MOBILE ENVIRONMENT AND DEVICE THEREFOR

CROSS-REFERENCE TO RELATED APPLICATIONS

The present application is a continuation of International Patent Application No. PCT/KR2017/005314, filed on May 23, 2017, which is based upon and claims the benefit of priority to U.S. patent application Ser. No. 15/183,242, filed on Jun. 15, 2016, and Korean Patent Application No. 10-2017-0003832, filed on Jan. 10, 2017. The disclosures of the above-listed applications are hereby incorporated by reference herein in their entirety.

TECHNICAL FIELD

The present disclosure relates to a method and device for reporting a quality of a mobile streaming service. More particularly, the present disclosure relates to a method in which a terminal device provided with a mobile streaming service through at least one communication network measures a quality of the streaming service, generates a mobile service quality indicator based on the measurement result, and reports the generated mobile service quality indicator.

BACKGROUND ART

Descriptions made in this section merely provide background information of embodiments of the present disclosure and do not constitute conventional art.

A real-time multimedia service, which is one of multimedia data transmission schemes, refers to a manner of playing back or consuming audio and video contents. Such real-time multimedia services may be classified into a conversational service, an interactive service, and a streaming service according to service types. Among them, the streaming service enables a real-time playback of multimedia data as soon as only a part of the data is received even though the whole data are not downloaded.

Compared to a download service, the streaming service is capable of further ensuring a real-time characteristic in a live broadcast.

Meanwhile, a pattern of consuming the streaming service by users is changing from using a wired network streaming service based on an Internet protocol television (IPTV) to using a wireless network streaming service based on a mobile device. Therefore, there is the trend toward an increase in traffic of a mobile streaming service, and it is very important to realize a service level agreement (SLA) in a mobile streaming service environment.

In addition, a mobile streaming service environment often confronts a severe variation in comparison with a streaming service environment based on a wired network. It is therefore required to check periodically, or if necessary, quality indicators related to the streaming service in the mobile network so as to provide a stable service.

Unfortunately, while the wired network streaming service based on the IPTV allows a set-top box to monitor a quality of service (QoS) or a quality of experience (QoE) in real time, the mobile streaming environment has difficulty in monitoring network conditions, such as QoS or QoE, in real time.

SUMMARY

In order to solve the above-discussed problems, the present disclosure is to provide a method and device for reporting a quality of a mobile streaming service. Specifically, the present disclosure enables a terminal device provided with the mobile streaming service to measure a quality of the streaming service and report a mobile service quality indicator generated based on the measurement result through an MQI message or an NAM feedback message in real time, thereby realizing the effective monitoring of network conditions even in a mobile streaming environment.

However, the present disclosure is not limited to the above objects, and any other object, even though not mentioned herein, may be well understood from the following description.

In order to accomplish the above objects, a service quality reporting method of a terminal device according to the present disclosure may comprise measuring a quality of a streaming service provided by a content providing device; generating a mobile service quality indicator, based on a measurement result; and transmitting the mobile service quality indicator to the content providing device.

In this method, the mobile service quality indicator may be contained in one of a message queue interface (MQI) message and a network abstraction for media (NAM) feedback message.

In addition, the MQI message may contain at least one of a generation time of the MQI message, identification information of the terminal device, a processing capability of the terminal device, a cell identifier (ID) of an area in which the terminal device is located, a number of occurrences of a buffer underrun during one period or a duration of the occurrence, an interval between packets during one period, a number of packets lost during transmission of content data, a type of a wireless network connected to the terminal device, a content error indicator, an indicator of a content transmission rate, and a moving speed of the terminal device. When the cell ID is contained, the MQI message may further contain information on a time at which the terminal device is entered in a cell corresponding to the cell ID.

In addition, the NAM feedback message may contain at least one of a generation time of the NAM feedback message, an available bitrate, a buffer size, a maximum bitrate, an average bitrate, a current delay time, a bit error rate, a number of packets lost during transmission of content data, an interval between packets during one period, detailed terminal information, and media quality information.

In this case, the detailed terminal information may include at least one of identification information of the terminal device and a cell identifier (ID), and the media quality information may include content error indicator.

In addition, the present disclosure may provide a non-transitory computer-readable recording medium storing a program for executing the above method.

In order to accomplish the above objects, a terminal device of the present disclosure may comprise a communication module configured to transmit or receive data to or from a content providing device through at least one communication network; and a control module configured to measure a quality of a streaming service provided by the content providing device, generate a mobile service quality indicator, based on a measurement result, and control the communication module to transmit the generated indicator to the content providing device.

In the terminal device, the mobile service quality indicator may be contained in one of a message queue interface (MQI) message and a network abstraction for media (NAM) feedback message.

According to the present disclosure, a terminal device provided with a mobile streaming service can measure a quality of the streaming service, generate, based on the measurement result, a mobile service quality indicator for monitoring QoS or QoE, and report the generated mobile service quality indicator through an MQI message or an NAM feedback message in real time. It is therefore possible to effectively monitor network conditions even in a mobile streaming environment.

Other various advantages and effects will be disclosed explicitly or implicitly in embodiments of this disclosure to be described below in detail.

DESCRIPTION OF DRAWINGS

FIGS. 3 and 4 are diagrams illustrating the syntax of an MQI message according to an embodiment of the present disclosure.

FIGS. 5 to 9 are diagrams illustrating the syntax of an NAM feedback message according to an embodiment of the present disclosure.

DETAILED DESCRIPTION

Figure 1:
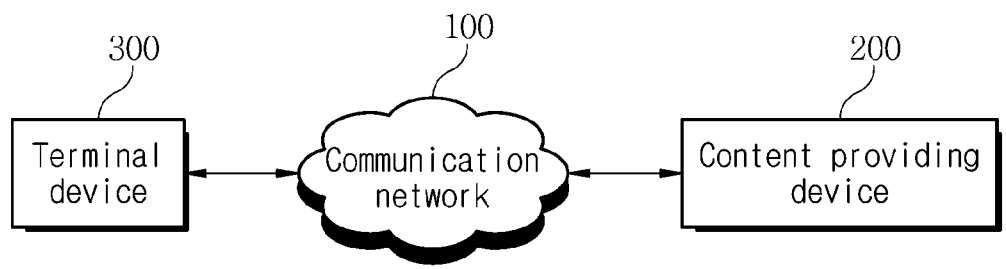
FIG. 1 is a diagram illustrating a configuration of a system for implementing a service quality reporting method according to an embodiment of the present disclosure.

Embodiments of the present disclosure will now be fully described with reference to the accompanying drawings to clarify features and advantages of the present disclosure.

In the following description and the accompanying drawings, well-known functions or elements may not be described or illustrated in detail to avoid obscuring the subject matter of the present disclosure. The same elements may be denoted by the same reference numerals throughout the drawings.

The terms and words used herein should not be construed as limited to ordinary or dictionary definition terms, but should be construed in light of the meanings and concepts consistent with the subject matter of the present disclosure on the basis of the principle that the inventor can properly define his own disclosure as the concept of the term to describe it in the best way. It is therefore to be understood that embodiments disclosed herein are merely exemplary and various equivalents or modifications thereof are possible.

Additionally, the terms including expressions "first", "second", etc. are used for merely distinguishing one element from other elements but do not limit the corresponding elements. The above expressions do not limit the sequence and/or importance of the elements.

Also, the terms used in describing various embodiments of this disclosure are only examples for describing a specific embodiment but do not limit such embodiments. Singular forms are intended to include plural forms unless the context clearly indicates otherwise. Unless defined differently, all terms used herein, which include technical terminologies or scientific terminologies, have the same meaning as that understood by a person skilled in the art to which the present disclosure belongs. The terms "include", "comprise", and "have" as well as derivatives thereof, mean inclusion without limitation.

Also, the terms such as "unit" or "module" used herein indicate a component for processing at least one function or operation and may be implemented by hardware, software, or combinations thereof. Further, the singular forms "a", "an", "one", "the", and the like include plural referents unless the context (particularly in claims) clearly dictates otherwise.

Besides the terms mentioned above, particular terms used in the following description are provided to aid in understanding the present disclosure. These particular terms may vary without departing from the subject matter of the present disclosure.

Embodiments of the present disclosure include a computer-readable medium which has computer-executable instructions or has or transfers a data structure stored therein. The computer-readable medium may be any available medium which is accessible by a general or special purpose computer system. For example, the computer-readable medium may include a physical storage medium, such as a random access memory (RAM), a read-only memory (ROM), an erasable programmable ROM (EPROM), a compact disc ROM (CD-ROM), other optical disk storage devices, a magnetic disk storage device, other magnetic storage devices, or any other medium which may be used to store and transfer a certain program code means having the form of computer-executable instructions, computer-readable instructions, or data structures and may be accessed by a general or special purpose computer system, but is not limited thereto.

In the following descriptions and claims, it is assumed that a technical background for implementing a service quality reporting method according to the present disclosure is moving picture experts group (MPEG) media transport (MMT).

In other words, a content providing device described in an embodiment of the present disclosure may be an MMT aware network entity (MANE) of the MPEG media transport protocol (MMTP) or be an external server which stores and transmits streaming contents.

However, this is merely an example for aiding in understanding the present disclosure, and the present disclosure is not limited to MMT.

Hereinafter, a service quality reporting method according to an embodiment of the present disclosure will be described in detail with reference to drawings.

FIG. 1 is a diagram illustrating a configuration of a system for reporting a service quality according to an embodiment of the present disclosure.

Referring to FIG. 1, the system for reporting a quality of a mobile streaming service according to an embodiment of the present disclosure may include a content providing device 200 and a terminal device 300. The content providing device 200 and the terminal device 300 are connected with each other through a communication network 100.

Each element of the system will now be described with reference to FIG. 1.

The communication network 100 serves to transfer data for data exchange between the content providing device 200 and the terminal device 300. The communication network 100 may use a wireless communication scheme such as wireless local area network (WLAN), wireless fidelity (WiFi), wireless broadband (WiBro), worldwide interoperability for microwave access (WiMAX), high speed downlink packet access (HSDPA), long term evolution (LTE), or LTE-advanced (LTE-A). In addition, any other communication scheme which is well known or will be implemented in the future may be used.

The content providing device 200 is an apparatus configured to transmit content data such as a video, which is stored therein or received from an external device (not shown), to the terminal device 300 through the communication network 100.

The content providing device 200 may transmit content data to the terminal device 300 in units of packets. As mentioned above, the packets may be MMT packets.

Particularly, in the present disclosure, the content providing device 200 transmits content optimized for a current mobile service environment with reference to a mobile service quality indicator included in a message queue interface (MQI) message, a network abstraction for media (NAM) feedback message, etc. received from the terminal device 300, thereby improving a quality of service (QoS) or a quality of experience (QoE).

For example, the content providing device 200 may increase or reduce the resolution of video content with reference to the MQI message or NAM feedback message transmitted by the terminal device 300.

That is, based on the MQI message or the NAM feedback message, the content providing device 200 may determine whether to adjust the spatial resolution of or the temporal resolution of the video content, determine whether to transmit the video content with a high definition (HD) quality or a standard definition (SD) quality, or determine whether to transmit the video content with a frame rate of 30 fps or 60 fps, and then transmit the video content to the terminal device 300.

In another example, the content providing device 200 may change a communication network for content transmission with reference to the MQI message or NAM feedback message transmitted by the terminal device 300.

That is, based on the MQI message or the NAM feedback message, the content providing device 200 may monitor the traffic of each communication network such as LTE or WiFi. Then, based on the monitoring result, the content providing device 200 may transmit the content to the terminal device 300 through the LTE network or the WiFi network in order to adjust the amount of traffic of each communication network, thereby improving the QoS or QoE provided to the user.

Also, if necessary, the content providing device 200 may transmit a part of the video content through the LTE network and transmit the rest of the video content through the WiFi network in order to adjust the amount of traffic and thereby improve the QoS or QoE.

That is, based on the MQI message or NAM feedback message transmitted by the terminal device 300, the content providing device 200 may transmit video data through the LTE network and transmit audio data through the WiFi network in order to distribute traffic to multiple paths according to the service quality indicator. Also, according to the service quality indicator, the content providing device 200 may transmit the I frame of video data through the WiFi network and transmit the B and P frames through the LTE network, thereby adjusting the amount of traffic.

Finally, the terminal device 300 may send a request for content to the content providing device 200 in response to a user input, and receive the requested content from the content providing device 200 in a streaming manner.

At this time, the content may be received in units of packets, and the packets may be MMT packets.

In particular, the terminal device 300 may measure a quality of a streaming service being provided by the content providing device 200 and generate a mobile service quality indicator based on the measurement result. In addition, the terminal device 300 may insert the mobile service quality indicator in an MQI message or an NAM feedback message and transmit the message to the content providing device 200 in order to report the mobile service quality to the content providing device 200.

Figure 2:
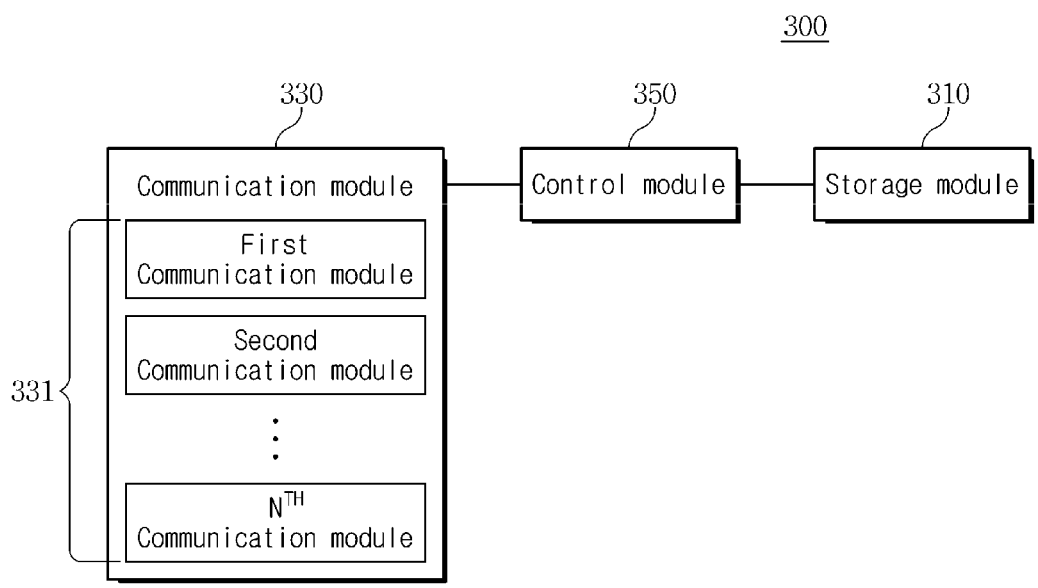
FIG. 2 is a block diagram illustrating a main configuration of a terminal device according to an embodiment of the present disclosure.

Now referring to FIG. 2, the terminal device 300 may be configured to include a storage module 310, a communication module 330, and a control module 350.

The storage module 310 may store therein content received through the communication module 330.

In particular, depending on characteristics of the streaming service, the storage module 310 may include a buffer (not shown) which temporarily stores the received content for a certain time.

The communication module 330 is configured to transmit or receive data to or from the content providing device 200 through the communication network 100. Through the communication module 330, the communication module 330 may transmit a request for content in response to a user input and receive the requested content. Also, the communication module 330 may transmit, to the content providing device 200, the MQI message or NAM feedback message including the mobile service quality indicator measured by the terminal device 300.

In particular, the communication module 330 may be divided into one or more communication modules 331 for accessing one or more communication networks.

For example, a first communication module 331 may be a communication module for accessing the LTE network, and a second communication module 331 may be a communication module for accessing the WiFi network.

The control module 350 is an apparatus configured to control the overall operation of the terminal device 300.

In particular, the control module 350 measures the quality of the streaming service being provided by the content providing device 200, generates the mobile service quality indicator based on the measurement result, and controls the communication module 330 to transmit the mobile service quality indicator to the content providing device 200.

The mobile service quality indicator may be transmitted after being inserted in the MQI message or the NAM feedback message.

Now, examples of the syntax of the MQI message or NAM feedback message including the mobile service quality indicator will be described with reference to FIGS. 3 to 9.

FIGS. 3 and 4 are diagrams illustrating examples of the syntax of an MQI message according to an embodiment of the present disclosure.

First, referring to FIG. 3 that shows one example of the syntax of the MQI message, the MQI message may include a "device_id" field indicating identification information of the terminal device 300. Representatively, the identification information of the terminal device 300 included in the "device_id" field may be a phone number assigned to the terminal device 300. The length of the "device_id" field may be 64 bits.

Also, the MQI message may include a "device_capability" field indicating a processing capability of the terminal device 300. The processing capability may refer to, for example, the resolution of an image processable by the terminal device 300, and the length thereof may be 32 bits.

A "C_id" field may be a cell identifier (ID) of an area in which the terminal device 300 is located, and the length thereof may be 32 bits.

A "buffer_underrun" field is an indicator representing the number of buffer underrun occurrences during one period, and the length thereof may be 8 bits.

An "Interface_type" field indicates the type of a wireless network currently connected to the terminal device 300, and the length thereof may be 8 bits. The wireless network connected to the terminal device 300 may be the WiFi network, the LTE network, or the like.

A "Video_quality" field indicates the number of occurrences of freeze errors (freeze), black errors (black), macro-block errors (MB error), etc. in video content during one period, and the length thereof may be 32 bits.

A "packet loss" field indicates the number of packets lost during transmission of content data, and the length thereof may be 8 bits.

An "SRR" field indicates an indicator of content transmission rate, such as a signal-to-interference-plus-noise ratio (SINR), a reference signal received power (RSRP), or a reference signal received quality (RSRQ), and the length thereof may be 32 bits.

A "moving_speed" field indicates a moving speed of the terminal device 300, and the length thereof may be 8 bits.

A "generation_time" field indicates a generation time of the MQI message and may be expressed in units of milli-seconds. The length thereof may be 32 bits.

Next, another example of the syntax of the MQI message will be described with reference to FIG. 4.

Among fields included in the MQI message of FIG. 4, a "generation_time" field, a "Rebuffering_duration" field, and an "Interface_type" field are identical to the "generation_time" field, the "buffer_underrun" field, and the "Interface_type" field of FIG. 3, respectively, and thus the descriptions thereof will not be reiterated.

A "client_id" field indicates identification information of the terminal device 300, and a representative example of the identification information may be a mobile station international subscriber directory number (MSISDN). The "client_id" field may have a length of 32 bits.

A "Time_C_id" field may include a cell ID of an area in which the terminal device 300 is located, and further include information on a time at which the terminal device 300 is entered in the corresponding cell. A representative value of the "Time_C_id" field may be a cell global identifier (CGI) and an evolved universal terrestrial radio access network (E-UTRAN) CGI (eCGI), and the length thereof may be 32 bits.

A "Jitter_duration" field indicates an interval between packets during one period and may have a length of 8 bits.

A "Packet_loss_count" field is an indicator representing how many packets have been lost during transmission of content data, and may have a length of 8 bits.

A "video_quality" field is an indicator representing the number of error occurrences in video content according to error types. Such error types may be a freeze error (freeze), a black error (black), and a macro-block error (MB).

In addition, the "video_quality" field may indicate the number of error occurrences that are measured with respect to each error type. The field length allocated to each error type may be 8 bits.

Now, examples of the syntax of an NAM feedback message including a mobile service quality indicator to be transmitted to the content providing device 200 will be described with reference to FIGS. 5 to 9.

Referring to FIG. 5 that shows one example of the syntax of the NAM feedback message, the NAM feedback message may include a "message_id" field of 16 bits and a "version" field of 8 bits. In addition, the NAM feedback message may further include a "length" field of 16 bits, an "NAM_flag" field of 1 bit to indicate flag information of the NAM feedback message, and a "reserved" field of 7 bits.

When the "NAM_flag" field has a value of 0, a "CLI_id" field indicating identification information of a cross layer interface (CLI) may be included with a length of 8 bits. Also, a "relative_available_bitrate" field indicating a relative available bitrate may be included with a length of 8 bits.

A "relative_buffer_fullness" field indicates a relative buffer size and may have a length of 16 bits.

A "relative_peak_bitrate" field indicates a relative maximum bitrate and may have a length of 32 bits.

An "average_bitrate_period" field indicates an average bitrate during one period and may have a length of 32 bits.

A "current_delay" field indicates delay information of currently transmitted content and may have a length of 32 bits.

A "BER" field indicates a bit error rate (BER).

A "C_id" field, a "buffer_underrun" field, an "Interface_type" field, a "Video_quality" field, and a "generation_time" field are identical to the "C_id" field, the "buffer_underrun" field, the "Interface_type" field, the "Video_quality" field, and the "generation_time" field of FIG. 3, respectively, and thus the descriptions thereof will not be reiterated.

Meanwhile, when the "NAM_flag" field has a value of 1, an "available_bitrate" field indicating an absolute available bitrate is included with a length of 32 bits.

A "buffer_fullness" field indicates an absolute buffer size and may have a length of 32 bits.

A "peak_bitrate" field indicates a maximum bitrate and may have a length of 32 bits.

An "SDU_size" field may have a length of 32 bits and indicates the size of a service data unit (SDU).

An "SDU_loss_ratio" field indicates a loss ratio of the SDU and may have a length of 8 bits.

A "CLI_id" field, an "average_bitrate_period" field, a "generation_time" field, a "BER" field, a "C_id" field, a "buffer_underrun" field, an "Interface_type" field, and a "Video_quality" field are identical to those of a case in which the "NAM_flag" field has a value of 0, and thus the descriptions thereof will not be reiterated.

Next, another example of the syntax of the NAM feedback message will be described with reference to FIG. 6.

Like the NAM feedback message of FIG. 5, the NAM feedback message of FIG. 6 may include a "message_id" field, a "version" field, a "length" field, an "NAM_flag" field, and a "reserved" field.

In addition, when the "NAM_flag" field has a value of 0, a "CLI_id" field, a "relative_available_bitrate" field, a "relative_buffer_fullness" field, a "relative_peak_bitrate" field, an "average_bitrate_period" field, a "current_delay" field, a "generation_time" field, a "BER" field, a "client_id" field, a "Time_C_id" field, a "Rebuffering_duration" field, a "Jitter_duration" field, a "Packet_loss_count" field, an "interface_type" field, and a "video_quality" field may be included. Among them, the "CLI_id" field, the "relative_available_bitrate" field, the "relative_buffer_fullness" field, the "relative_peak_bitrate" field, the "average_bitrate_period" field, the "current_delay" field, and the "BER" field are respectively identical to the "CLI_id" field, the "relative_available_bitrate" field, the "relative_buffer_fullness" field, the "relative_peak_bitrate" field, the "average_bitrate_period" field, the "current_delay" field, and the "BER" field of a case in which the "NAM_flag" field of FIG. 5 has a value of 0.

Also, the "generation_time" field, the "client_id" field, the "Time_C_id" field, the "Rebuffering_duration" field, the "Jitter_duration" field, the "Packet_loss_count" field, the "interface_type" field, and the "video_quality" field are identical to the "generation_time" field, the "client_id" field, the "Time_C_id" field, the "Rebuffering_duration" field, the "Jitter_duration" field, the "Packet_loss_count" field, the "interface_type" field, and the "video_quality" field, respectively, as shown in FIG. 4.

Meanwhile, when the "NAM_flag" field has a value of 1, a "CLI_id" field, an "available_bitrate" field, a "buffer_fullness" field, a "peak_bitrate" field, an "average_bitrate_period" field, a "current_delay" field, an "SDU_size" field, an "SDU_loss_ratio" field, a "generation_time" field, a "BER" field, a "client_id" field, a "Time_C_id" field, a "Rebuffering_duration" field, a "Jitter_duration" field, a "Packet_loss_count" field, an "interface_type" field, and a "video_quality" field may be included. Among them, the "CLI_id" field, "the available_bitrate" field, the "buffer_fullness" field, the "peak_bitrate" field, the "average_bitrate_period" field, the "current_delay" field, the "SDU_size" field, the "SDU_loss_ratio" field, the "generation_time" field, and the "BER" field are respectively identical to the "CLI_id" field, the "available_bitrate" field, the "buffer_fullness" field, the "peak_bitrate" field, the "average_bitrate_period" field, the "current_delay" field, the "SDU_size" field, the "SDU_loss_ratio" field, the "generation_time" field, and the "BER" field of a case in which the "NAM_flag" field of FIG. 5 has a value of 1.

Also, the "generation_time" field, the "client_id" field, the "Time_C_id" field, the "Rebuffering_duration" field, the "Jitter_duration" field, the "Packet_loss_count" field, the "interface_type" field, and the "video_quality" field are identical to the "generation_time" field, the "client_id" field, the "Time_C_id" field, the "Rebuffering_duration" field, the "Jitter_duration" field, the "Packet_loss_count" field, the "interface_type" field, and the "video_quality" field, respectively, as shown in FIG. 4.

Now, still another syntax example of the NAM feedback message will be described with reference to FIGS. 7 to 9.

Hereinafter, only modified or added parameters will be described in comparison with another syntax example of the NAM feedback message of FIG. 6.

In the syntax example shown in FIG. 7, a mobile_info_descriptor for detailed information of the terminal device and a media_quality_descriptor for the media quality are newly defined.

In order to indicate whether the above two descriptors are executed or not, a "mobile_info_descriptor_flag" field and a "media_quality_descriptor_flag" field are included. When each field value is 1, each descriptor is executed and a report is made to the content providing device 200.

Also, the syntax of a case where the value of the "NAM_flag" field is 0 may be symmetrical with the syntax of a case where the value is 1. For this, when the value of the "NAM_flag" field is 1, the order of the "average_bitrate_period" field and the "current_dalay" field is changed, and the "SDU_size" field and the "SDU_loss_ratio" field are located after the "BER" field.

Also, in order to maintain consistency with other messages, the "NAM_flag" field and the "reserved" field are placed in a message payload.

FIG. 8 shows the syntax of the mobile_info_descriptor, and FIG. 9 shows the syntax of the media_quality_descriptor.

In connection with FIG. 7, Table 1 describes the mobile_info_descriptor and the media_quality_descriptor, which are newly defined, and parameters modified or added.

TABLE 1

| Parameter | Description |
| --- | --- |
| mobile_info_descriptor | Mobile information descriptor contains information which is associated with MMT receiving entity in case it is a mobile device. When MMT receiving entity is a cellular mobile device, it can have mobile-specific attributes including MSISDN or Cell ID |
| mobile_info_descriptor_flag | indicates whether mobile_info_descriptor is included or not. If it is set to '1', the descriptor is included. |
| media_quality_descriptor | Media quality descriptor contains information on playback quality of media at MMT receiving entity side. |
| media_quality_descriptor_flag | indicates whether media_quality_descriptor is included or not. If it is set to '1', the descriptor is included. |
| jitter_duration | indicates total duration of playback bufferunderrun measured during the period specified in MC message in milliseconds. The length of this field is 32 bits. |

Tables 2 and 3 below describe parameters included in the syntax of the mobile_info_descriptor and the media_quality_descriptor defined in FIGS. 8 and 9, respectively.

TABLE 2

| Parameter | Description |
| --- | --- |
| descriptor_tag | a tag value indicating the type of this descriptor. |
| descriptor_length | indicates the length in bytes counting from the next byte after this field to the last byte of the descriptor. |
| MSISDN_flag | indicates whether MSISDN is included or not. If it is set to '1', the descriptor is included. |

TABLE 2-continued

| Parameter | Description |
| --- | --- |
| IMSI_flag | indicates whether IMSI is included or not. If it is set to '1', the descriptor is included. |
| current_cell_id_flag | indicates whether current_cell_ID is included or not. If it is set to '1', the descriptor is included. |
| MSISDN | indicates MSISDN (Mobile Subscriber International Subscriber Directory Number) number of MMT receiving entity. The length of this field is 15 decimal digits, which is coded into 60 binary digits where each decimal digit is assigned 4 binary bits. |
| IMSI | indicates IMSI (International Mobile Subscriber Identity) number of MMT receiving entity. The length of this field is 15 decimal digits, which is coded into 60 binary digits where each decimal digit is assigned 4 binary bits. |
| current_cell_id | indicates current cell ID (CGI for 2G/3G and eCGI for 4G). It is assigned a 15 decimal digit code which corresponds to totally 60 bits where 4 bits are assigned for each 1 decimal digit. |

TABLE 3

| Parameter | Description |
| --- | --- |
| num_time_sample | indicates the count of time instances (timestamp) at which the media quality is measured. |
| timestamp | indicates the time instance at which the media quality is measured based on UTC. The format is the "short-format". The unit is a second. |
| freeze | indicates total count of consecutive playback video frames which is identical and measured from current timestamp to next timestamp. It counts all the frames which is consecutive and same even though its first head frame is different. |
| black | indicates total count of black playback video frames which is measured from current timestamp to next timestamp. It counts all the wholly black frames. |
| mb_error | indicates total count of video frames which has macro block error measured from current timestamp to next timestamp. |
| decoding_error | indicates total count of audio frame decoding error measured from current timestamp to next timestamp. |
| rebuffering_duration | indicates total duration of abnormal playback measured during the period specified in MC message in milliseconds. The length of this field is 32 bits. |

As described above, the MQI message or the NAM feedback message according to one syntax example always contain detailed terminal information, such as the identification information of the terminal device or the cell ID, and media quality information such as the content error indicator (i.e., the video quality). However, the NAM feedback message according to still another syntax example separately defines the mobile_info_descriptor for the detailed terminal information and the media_quality_descriptor for the media quality information. In addition, a flag value for such information is set. That is, only when such information is needed, the flag value is set to 1 so that such information is transmitted from the terminal device 300 to the content providing device 200. Accordingly, it is possible to reduce the length of message syntax in comparison with existing messages.

As described above, this disclosure includes many particular implementation details. However, these particular implementation details should not be construed as limitations of the disclosure or of what may be claimed. Rather, they should be construed as descriptions of features specific to particular embodiments of the disclosure.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description sets forth the best mode of the disclosure and provides examples to describe the disclosure and to enable those of ordinary skill in the art to implement and use the disclosure. This written description does not limit the disclosure to the precise terms set forth. Thus, while the disclosure has been described in detail with reference to the examples set forth above, those of ordinary skill in the art may make alterations, modifications, and variations to the examples without departing from the scope of the disclosure.

Consequently, the scope of the present disclosure should be determined by the claims rather than the described embodiments.

The present disclosure relates to a method and device for reporting a quality of a mobile streaming service. According to the present disclosure, a terminal device provided with the mobile streaming service can measure the quality of the streaming service, generate, based on the measurement result, a mobile service quality indicator, and report the generated mobile service quality indicator through an MQI message or an NAM feedback message in real time. It is therefore possible to effectively monitor network conditions even in a mobile streaming environment.

Accordingly, the service quality reporting method may contribute to the development of the streaming service industry. In addition, the present disclosure has a good possibility of sales on the market or business and therefore has industrial applicability suitable for practical and apparent implementation.

What is claimed is:

1. A method of reporting a service quality to a service providing device by a terminal device provided with content through mobile streaming, the method comprising:
measuring a quality of a streaming service provided by the content providing device;
generating a mobile service quality indicator, based on a measurement result; and
transmitting the mobile service quality indicator to the content providing device,
wherein the mobile service quality indicator is contained in a message queue interface (MQI) message, and
wherein the MQI message contains at least one of a number of occurrences of a buffer underrun during one period or a duration of the occurrence, an interval between packets during one period, a number of packets lost during transmission of content data, a type of a wireless network connected to the terminal device, a content error indicator, an indicator of a content transmission rate, and a moving speed of the terminal device.

2. The method of claim 1,
wherein the MQI message further contains a cell identifier (ID) of an area in which the terminal device is located, and
wherein when the cell ID is contained, the MQI message further contains information on a time at which the terminal device is entered in a cell corresponding to the cell ID.

3. A non-transitory computer-readable recording medium storing a program for executing a method of reporting a service quality to a service providing device by a terminal device provided with content through mobile streaming, the method comprising:
measuring a quality of a streaming service provided by the content providing device;
generating a mobile service quality indicator, based on a measurement result; and
transmitting the mobile service quality indicator to the content providing device,
wherein the mobile service quality indicator is contained in a message queue interface (MQI) message, and
wherein the MQI message contains at least one of a number of occurrences of a buffer underrun during one period or a duration of the occurrence, an interval between packets during one period, a number of packets lost during transmission of content data, a type of a wireless network connected to the terminal device, a content error indicator, an indicator of a content transmission rate, and a moving speed of the terminal device.

4. A terminal device provided with content through mobile streaming, the terminal device comprising:
a communication module configured to transmit or receive data to or from a content providing device through at least one communication network; and
a control module configured to measure a quality of a streaming service provided by the content providing device, generate a mobile service quality indicator, based on a measurement result, and control the communication module to transmit the generated indicator to the content providing device,
wherein the mobile service quality indicator is contained in a message queue interface (MQI) message, and
wherein the MQI message contains at least one of a number of occurrences of a buffer underrun during one period or a duration of the occurrence, an interval between packets during one period, a number of packets lost during transmission of content data, a type of a wireless network connected to the terminal device, a content error indicator, an indicator of a content transmission rate, and a moving speed of the terminal device.

* * * * *